United States Patent
Shao et al.

(10) Patent No.: US 10,345,536 B2
(45) Date of Patent: Jul. 9, 2019

(54) OPTICAL FIBER CONNECTOR AND METHOD OF ATTACHING AND DETACHING SAME

(71) Applicant: CommScope Telecommunications (Shanghai) Co., Ltd., Shanghai (CN)

(72) Inventors: Liang Shao, Shanghai (CN); Yanhong Yang, Shanghai (CN)

(73) Assignee: CommScope Telecommunications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/541,968

(22) PCT Filed: Jan. 5, 2016

(86) PCT No.: PCT/CN2016/070150
§ 371 (c)(1),
(2) Date: Nov. 22, 2017

(87) PCT Pub. No.: WO2016/110247
PCT Pub. Date: Jul. 14, 2016

(65) Prior Publication Data
US 2018/0067266 A1    Mar. 8, 2018

(30) Foreign Application Priority Data

Jan. 6, 2015 (CN) .......................... 2015 1 0004795
Jan. 6, 2015 (CN) ...................... 2015 2 0006150 U

(51) Int. Cl.
*G02B 6/38* (2006.01)
*G02B 6/42* (2006.01)

(52) U.S. Cl.
CPC ............. *G02B 6/389* (2013.01); *G02B 6/381* (2013.01); *G02B 6/3846* (2013.01);
(Continued)

(58) Field of Classification Search
CPC ...... G02B 6/389; G02B 6/381; G02B 6/3874; G02B 6/3887; G02B 6/4256
See application file for complete search history.

(56) References Cited

U.S. PATENT DOCUMENTS

| 4,693,550 A | 9/1987 | Brown et al. |
| 5,230,032 A * | 7/1993 | Muzslay ................. G02B 6/25 385/139 |

(Continued)

FOREIGN PATENT DOCUMENTS

| CN | 202171660 U | 3/2012 |
| CN | 202383324 U | 8/2012 |

(Continued)

OTHER PUBLICATIONS

International Search Report and Written Opinion of the International Searching Authority for corresponding International Patent Application No. PCT/CN2016/070150 dated Mar. 25, 2016, 10 pages.

(Continued)

*Primary Examiner* — Peter Radkowski
(74) *Attorney, Agent, or Firm* — Merchant & Gould P.C.

(57) ABSTRACT

The present invention discloses an optical fiber connector, comprising: a housing, a ferrule installed within said housing; an end sleeve, connecting to the rear end of said housing; and an optical cable clamp, installed by insertion within said end sleeve, being provided for the purpose of clamping an optical cable. Said optical cable is secured within said optical cable clamp, and after said optical cable clamp is inserted and secured within said end sleeve, the optical fiber of said optical cable is inserted within said housing and butt-joined with the embedded optical fiber within said ferrule. As a result of this, before the butt-joined optical fibers are locked in, the optical cable has already been secured within the optical cable clamp and fixed to the (Continued)

connector housing. Therefore, the butt-joined optical fibers cannot be separated due to the effects of unexpected pulling force, thus ensuring the optical fiber of the optical cable reliably abuts the embedded optical fiber.

19 Claims, 4 Drawing Sheets

(52) U.S. Cl.
CPC ......... *G02B 6/3874* (2013.01); *G02B 6/3887* (2013.01); *G02B 6/4256* (2013.01)

(56) References Cited

U.S. PATENT DOCUMENTS

| | | | |
|---|---|---|---|
| 5,261,020 A | 11/1993 | De Jong et al. | |
| 5,682,450 A * | 10/1997 | Patterson | G02B 6/3809 385/55 |
| 5,732,174 A * | 3/1998 | Carpenter | G02B 6/3809 385/58 |
| 5,802,230 A * | 9/1998 | Kuribayashi | G02B 6/4246 385/88 |
| 6,302,592 B1 * | 10/2001 | Zullig | G02B 6/3849 385/56 |
| 6,623,177 B1 * | 9/2003 | Chilton | G02B 6/43 385/134 |
| 7,090,406 B2 * | 8/2006 | Melton | G02B 6/3869 385/147 |
| 7,591,595 B2 * | 9/2009 | Lu | G02B 6/3816 385/60 |
| 8,480,314 B2 * | 7/2013 | Saito | G02B 6/3862 385/95 |
| 2004/0161204 A1 * | 8/2004 | Zimmel | G02B 6/3825 385/73 |
| 2004/0223720 A1 * | 11/2004 | Melton | G02B 6/3869 385/147 |
| 2007/0211997 A1 | 9/2007 | Saito et al. | |
| 2008/0031573 A1 * | 2/2008 | Droege | G02B 6/3834 385/78 |
| 2008/0107383 A1 * | 5/2008 | Droege | G02B 6/3834 385/80 |
| 2008/0175542 A1 * | 7/2008 | Lu | G02B 6/3816 385/62 |
| 2009/0067789 A1 * | 3/2009 | Droege | G02B 6/3834 385/80 |
| 2010/0034502 A1 * | 2/2010 | Lu | G02B 6/3816 385/60 |
| 2010/0098381 A1 | 4/2010 | Larson et al. | |
| 2010/0129031 A1 * | 5/2010 | Danley | G02B 6/3818 385/59 |
| 2010/0322568 A1 * | 12/2010 | Zimmel | G02B 6/3885 385/81 |
| 2011/0019964 A1 * | 1/2011 | Nhep | G02B 6/3825 385/135 |
| 2011/0079930 A1 * | 4/2011 | Saito | G02B 6/3846 264/1.25 |
| 2011/0268391 A1 * | 11/2011 | Wang | G02B 6/3825 385/53 |
| 2012/0045177 A1 * | 2/2012 | Droege | G02B 6/3834 385/80 |
| 2014/0064665 A1 * | 3/2014 | Ott | G02B 6/3821 385/60 |

FOREIGN PATENT DOCUMENTS

| | | |
|---|---|---|
| CN | 202735548 U | 2/2013 |
| CN | 103364887 | 10/2013 |
| CN | 203587843 U | 5/2014 |
| CN | 204389736 U | 6/2015 |
| JP | 2010-134102 | 6/2010 |
| JP | 2010134103 A * | 6/2010 |
| WO | 92/19998 A1 | 11/1992 |

OTHER PUBLICATIONS

Chinese Office Action for corresponding Chinese Patent Application No. 201510004795.8 dated Apr. 6, 2017, 12 pages.
Extended European Search Report for corresponding European Patent Application No. 16734907.5 dated Jun. 12, 2018, 8 pages.

* cited by examiner

# OPTICAL FIBER CONNECTOR AND METHOD OF ATTACHING AND DETACHING SAME This application is National Stage Application of PCT/CN2016/070150, filed on 5 Jan. 2016, which claims the benefit of Chinese patent application 201510004795.8 submitted to the State Intellectual Property Office of the People's Republic of China on 6 Jan. 2015, and claims the benefit of Chinese patent application 201520006150.3 submitted to the State Intellectual Property Office of the People's Republic of China on 6 Jan. 2015, the disclosures of which are hereby incorporated by reference in their entireties. To the extent appropriate, a claim of priority is made to each of the above disclosed applications.

TECHNICAL FIELD

The present invention relates to a type of optical fibre connector, in particular to that of an optical fibre connector that allows rapid on-site attachment and detachment.

PRIOR ART

In the prior art, the process by which rapid on-site assembly of optical fibre connectors takes place generally comprises the following steps: 1) the external skin of the optical cable is stripped off, as is the protective layer of the optical fibre, and the optical fibre sliced; 2) the optical fibre of the optical cable is inserted into the connector housing and abutted to the embedded optical fibre within the housing; 3) the abutted optical cable optical fibre and the embedded optical fibre are locked in; and 4) the optical cable is secured to the connector housing.

In terms of the rapid onsite abutting of such optical fibre connectors, the following problems exist in the installation process: due to the complexity of on-site installation environments, after abutted optical fibres have been locked in, and prior to securing the optical cable, the optical cable may be unexpectedly subjected to tension resulting in optical fibre of optical cable that has already been locked in being pulled out, apart from which, in the course of securing optical cable, it is easy to damage the butt-join between optical fibres.

The reason for said problems occurring in the prior art is that the optical cable securing step occurs after the optical fibre locking takes place. If the optical cable securing step takes place before the optical fibre locking step, an extremely effective butt-join between optical fibres can be ensured.

In addition, at the time of abutting the optical cable optical fibre and embedded optical fibre, in order to ensure reliable contact between the end surface of the optical cable optical fibre and the end surface of the embedded optical fibre, a slight curve is introduced to the optical cable optical fibre when butt-joining, and by exerting a certain amount of pre-exerted thrust on the end surface of the optical cable optical fibre and the embedded optical fibre as a result of a suitably deformed curved shaped in the optical cable optical fibre, it is possible to ensure that reliable contact is maintained between the end surface of the optical cable optical fibre and the embedded optical fibre end surface. In the prior art, however, once the optical cable has been securely fixed, it is not possible to release the slight curvature that occurs from butt-joining the optical cable optical fibre. In view of this, when said optical fibre connector is connected to another optical fibre connector via an optical fibre adapter, the slight curvature of the optical cable optical fibre increases (since when two optical fibre connectors are connected, the optical cable optical fibre is subjected to the axial thrust of a spring), thus affecting the optical performance of the two connected optical fibre connectors.

SCOPE OF THE INVENTION

The aim of the present invention is to resolve at least one aspect of the aforementioned problems and drawbacks encountered in the prior art.

One aim of the present invention is to provide an optical fibre connector, said optical fibre connector being capable of ensuring a reliable butt-join between the optical cable optical fibre and the embedded optical fibre.

A further aim of the present invention is to provide an optical fibre connector, said optical fibre connector being suited to rapid on-site attachment and detachment.

According to one aspect of the present invention, an optical fibre connector is provided, which consists of: a housing; a ferrule installed within said housing; an end sleeve, connecting to the rear end of said housing; and an optical cable clamp, inserted into said end sleeve, for the purposes of clamping the optical cable. Said optical cable is secured within said optical cable clamp, and after said optical cable clamp has been inserted and secured within said end sleeve, an optical fibre of said optical cable is inserted into said housing and butt-jointed to an embedded optical fibre within the ferrule.

According to one embodiment of the present invention, said end sleeve and said optical cable clamp are structured in such a way that allows said optical cable clamp to be retained within said end sleeve in a separate first position and second position; when said optical cable clamp is retained in said first position, the optical fibre of said optical cable is subjected to thrust by said optical cable clamp causing it to curve; and when said optical cable clamp is retained in said second position, the optical fibre of said optical cable is no longer subjected to thrust by said optical cable clamp and straightens again.

According to a further embodiment of the present invention, a pair of elastic reeds is formed on the external wall of said optical cable clamp, there being paired positioning lugs formed on the internal wall of said end sleeve; when the optical cable clamp, within which an optical cable is fastened, is inserted into said end sleeve, the pair of elastic reeds of said optical cable clamp are such that they separately rest against the paired positioning lugs of said end sleeve, allowing for the retention of said optical cable clamp in said first position; when said optical cable clamp is retained in said first position, the optical fibre of said optical cable is subjected to thrust by said optical cable clamp, causing it to curve, which is convenient in terms of the effective butt-joining of the end surface of said optical cable optical fibre and the embedded optical fibre end surface.

According to another illustrative embodiment of the present invention, said positioning lugs possess an arced external surface, as a result of which the paired elastic reeds of the optical cable clamp are able to slide past said positioning lugs when subjected to a predetermined tension.

According to another illustrative embodiment of the present invention, said positioning lugs possess smooth semi-spherical external surfaces.

According to another illustrative embodiment of the present invention, a pair of retaining protrusions are provided on the internal wall of said end sleeve, said pair of retaining protrusions being positioned behind said paired positioning lugs; when an optical cable in the first position is subjected to a predetermined tension, the elastic reeds on said optical cable clamp slide past the positioning lugs, and connect with said retaining protrusions, as a result of which said optical cable clamp is retained in said second position, thus preventing the optical cable clamp from being pulled out of said end sleeve; additionally, when said optical cable clamp is retained in said second position, the optical fibre of said optical cable is no longer subjected to thrust by said optical cable clamp, and straightens again.

According to another illustrative embodiment of the present invention, paired flexible arms are formed on the lateral wall of said end sleeve, said paired flexible arms being such that they may separately exert pressure on the paired elastic reeds of said optical cable clamp, thus allowing the disconnection of said paired elastic reeds from said retaining protrusions.

According to another illustrative embodiment of the present invention, said positioning lugs are formed on the internal surfaces of said flexible arms; additionally, when said flexible arms exert pressure on said elastic reeds, said positioning lugs exert pressure directly on said elastic reeds.

According to another illustrative embodiment of the present invention, said flexible arms possess raised sections, said raised sections protruding externally from openings formed in the lateral walls of said end sleeve.

According to another illustrative embodiment of the present invention, said optical fibre connector also comprises of a dust cap in a sleeved arrangement on the front end of said ferrule.

According to another illustrative embodiment of the present invention, said optical fibre connector also comprises a V-shaped alignment slot located within said housing, the optical fibre within said optical cable and the embedded optical fibre within said ferrule being butt-joined within said V-shaped alignment slot.

According to another illustrative embodiment of the present invention, said optical fibre connector further comprises an optical fibre locking mechanism installed within said housing, said optical fibre locking mechanism being such that it allows the optical cable optical fibre and embedded optical fibre that have already been butt-joined to be locked in an appropriate position.

According to another aspect of the present invention, a method of attaching an optical fibre connector is provided, comprising of the following steps:

S110: pre-prepared optical cable is secured in an optical cable clamp; and

S120: the optical cable clamp within which the optical cable is securely fastened is secured to the connector housing, then the optical fibre of the optical cable is inserted into the housing of the connector, resulting in the optical cable optical fibre being butt-joined with the embedded optical fibre within the connector housing; and S130: the butt-joined optical cable optical fibre and the embedded optical fibre being locked in.

According to one illustrative embodiment of the present invention, said optical cable clamp is installed by insertion within an end sleeve, said end sleeve being connected to the rear end of the housing of said connector, thus allowing said optical cable clamp to be secured to the housing of said connector.

According to another illustrative embodiment of the present invention, said end sleeve and said optical cable clamp are structured in such a way that allows said optical cable clamp to be retained within said end sleeve in a separate first position and second position; when said optical cable clamp is retained in said first position, the optical fibre of said optical cable is subjected to thrust by said optical cable clamp causing it to curve; additionally, when said optical cable clamp is retained in said second position, the optical fibre of said optical cable is no longer subjected to thrust by said optical cable clamp and straightens again.

According to one illustrative embodiment of the present invention, the aforementioned optical fibre connector attachment method is such that it is an optical fibre connector as mentioned in any of the foregoing embodiments.

According to another illustrative embodiment of the present invention, in the aforementioned step S120, the pair of elastic reeds of said optical cable clamp are such that they separately rest against the paired positioning lugs of said end sleeve, allowing for the retention of said optical cable clamp in said first position.

According to another illustrative embodiment of the present invention, the previously mentioned method also includes the following step:

S140: pulling said optical cable clamp outwards, causing the elastic reeds of said optical cable clamp to slide over the positioning lugs and to connect with the retaining protrusions on said end sleeve, thus causing said optical cable clamp to remain in said second position.

According to another aspect of the present invention, a method for detaching an optical fibre connector is provided, comprising the following steps:

S210: unlocking of said optical cable optical fibre and the embedded optical fibre;

S220: exerting pressure inwards on the raised sections of the paired flexible arms, thus causing the paired flexible arms to exert pressure separately on the pair of elastic reeds of the optical cable clamp, thus releasing the connection between the elastic reeds and the retaining protrusions; and S230: pulling outwards of said optical cable clamp allowing the removal of said optical cable clamp from said end sleeve.

In the various embodiments of the optical fibre connector according to the present invention, the optical cable is first secured within an optical fibre clamp, after which the optical cable clamp within which the optical cable is fixed is secured to the connector housing, the optical fibre of the optical cable being inserted into the housing of the connector at the same time, undergoing butt-joining with the embedded optical fibre within the housing; then once the optical fibres have been butt-joined, the butt-joined optical fibres are then locked in. Consequently, in the present invention, before the butt-joined optical fibres are locked in, the optical cable has already been secured to the optical cable clamp and fixed to the housing of the connector; as a result, the optical fibres that have already been butt-joined are not subjected to the effects of unexpected tension, thus ensuring an effective butt-join between the optical cable optical fibre and the embedded optical fibre.

Furthermore, in certain embodiments of the present invention, the interaction between the end sleeve and the optical cable clamp releases the slight curvature that occurs from butt-joining the optical cable optical fibre, thus improving the optical performance of the optical fibre connector.

The descriptions of the present invention in the following text taken in conjunction with the appended diagrams clarify the various aims and advantages of the invention, and are of assistance in gaining a full understanding of the present invention.

EMBODIMENTS

The following implementations, taken in conjunction with the appended diagrams, provide a more detailed description of the technical schemes of the present invention. Within the Description, numbering that is the same or similar occurring in the appended diagrams refers to components that are the same or similar. The aim of the following description of the modes of implementation of the invention, taken in conjunction with the appended diagrams, is to aid in interpretation of the overall conceptual framework of this invention, and should not be understood as restricting the present invention in any way.

Furthermore, in the following detailed descriptions, for convenience of interpretation, many specific details are provided in order to allow a full understanding of the implementations disclosed. It should be clear that, one or more implementations would be possible without these specific details. In all other cases, structures and apparatus which are common knowledge are represented graphically to allow simplification of the appended diagrams.

An overall technical conceptualisation according to the present invention, provides an optical fibre connector, comprising: a housing; a ferrule installed within said housing; an end sleeve, connecting to the rear end of said housing; and an optical cable clamp, inserted into said end sleeve, for the purposes of clamping the optical cable. Said optical cable is secured within said optical cable clamp, and after said optical cable clamp has been inserted and secured within said end sleeve, the optical fibre of said optical cable is inserted into said housing and butt-jointed to an embedded optical fibre within the ferrule.

Figure 1:
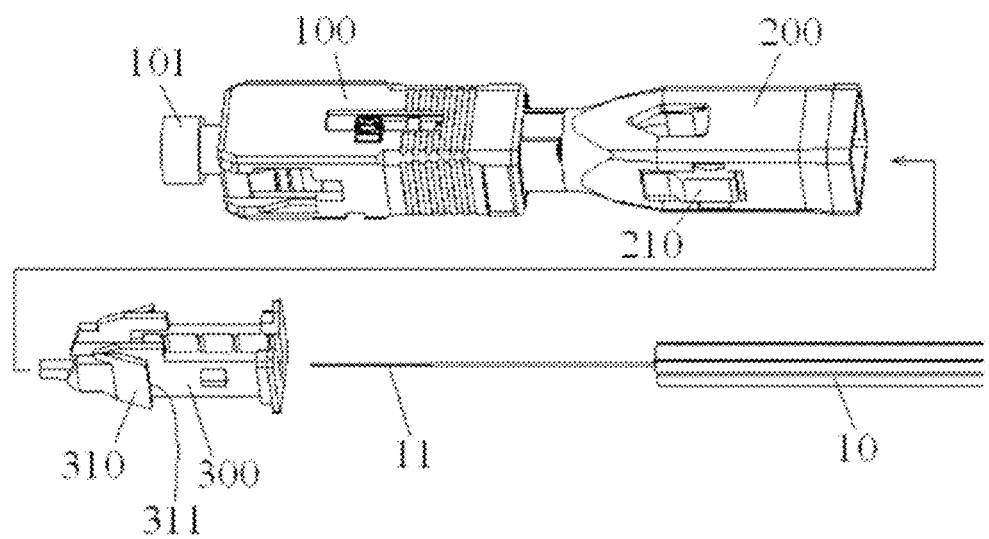
FIG. 1 is a segmented graphical representation of an embodiment of the optical fibre connector according to the present invention.

FIG. 1 is a segmented graphical representation of an embodiment of the optical fibre connector according to the present invention.

One illustrative embodiment of the present invention discloses an optical fibre connector. As is shown in FIG. 1, said optical fibre connector mainly comprises of a housing 100, a ferrule 110 (see FIG. 4) installed within said housing 100, an end sleeve 200 connecting to the rear end of the housing 100, and an optical cable clamp 300 suitable for installation by insertion into the end sleeve 200.

Figure 2:
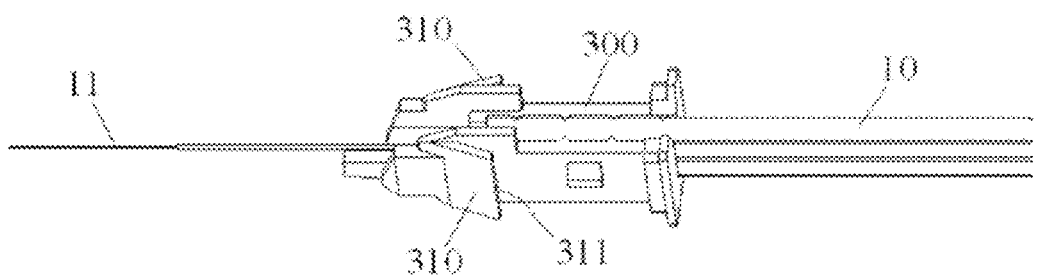
FIG. 2 is a graphical representation of the optical cable of the optical fibre connector as shown in FIG. 1 secured to the optical cable clamp.

FIG. 2 is a graphical representation of the optical cable 10 of the optical fibre connector as shown in FIG. 1 secured to the optical cable clamp 300.

As is shown in FIG. 1 and FIG. 2, the optical cable clamp 300 is provided for the purpose of clamping pre-prepared optical cable 10. Here, pre-prepared optical cable 10 refers to: optical cable 10 from which a section of outer skin has been stripped, optical fibre 11 from which a section of the protective layer has been stripped, the exposed end section of the optical fibre 11 having been processed by being sliced and polished.

Figure 3:
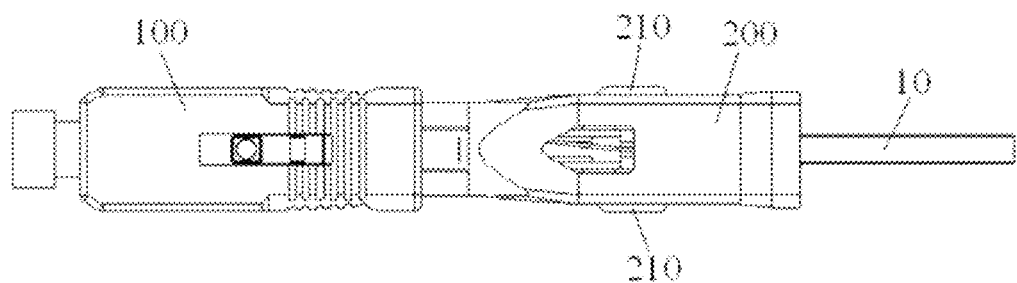
FIG. 3 is a graphical representation of the optical cable clamp to which the optical cable has already been securely installed by insertion into the end sleeve.
Figure 4:
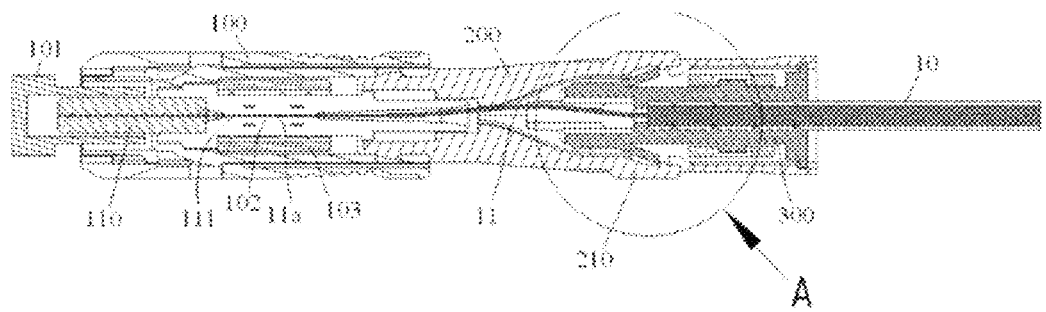
FIG. 4 is a representation of a vertical cross-section of the optical fibre connector in FIG. 3.

FIG. 3 is a graphical representation of the optical cable clamp 300 to which the optical cable 10 has already been securely installed by insertion into the end sleeve 200; FIG. 4 is a representation of a vertical cross-section of the optical fibre connector in FIG. 3.

As is shown in FIG. 1 to FIG. 4, once the optical cable clamp 300 to which the optical cable 10 has been securely fastened is inserted and secured within the end sleeve 200, the optical fibre 11 within the optical cable 10 is inserted into the housing 100 and butt-joined with the embedded optical fibre 111 within the ferrule 110.

Figure 5:
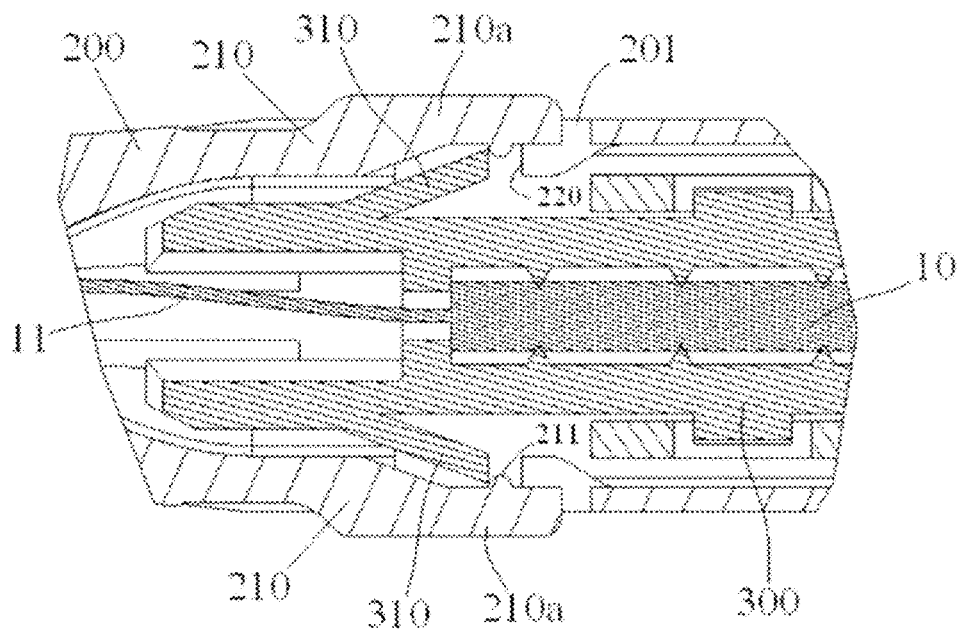
FIG. 5 is a magnified graphical representation of section A of the optical fibre connector shown in FIG. 4, wherein the optical cable optical fibre 11 has thrust exerted on it by the optical cable clamp, resulting in appropriate curvature.

FIG. 5 is a magnified graphical representation of section A of the optical fibre connector shown in FIG. 4, wherein the optical cable optical fibre 11 has thrust exerted on it by the optical cable clamp 300, resulting in appropriate curvature.

According to one illustrative embodiment of the present invention, as shown in FIG. 1 to FIG. 5, paired elastic reeds 310 are formed on the external wall of said optical cable clamp 300, there being paired positioning lugs 211 formed on the internal wall of said end sleeve 200. When the optical cable clamp 300 to which the optical cable 10 has been fastened is inserted into the end sleeve 200, as shown in FIG. 5, the paired elastic reeds 310 of said optical cable clamp 300 separately rest on the paired positioning lugs 211 of said end sleeve 200, allowing for the retention of said optical cable clamp 300 in said first position. When the optical cable clamp 300 is retained in the first position (the position shown in FIG. 5), the optical fibre 11 of the optical cable 10 is subjected to thrust by the optical cable clamp 300, causing it to curve slightly, which is convenient in terms of the reliable butt-joining of the end surface of the optical cable 10 optical fibre 11 and the end surface of the embedded optical fibre 111 within the ferrule 110.

Figure 6:
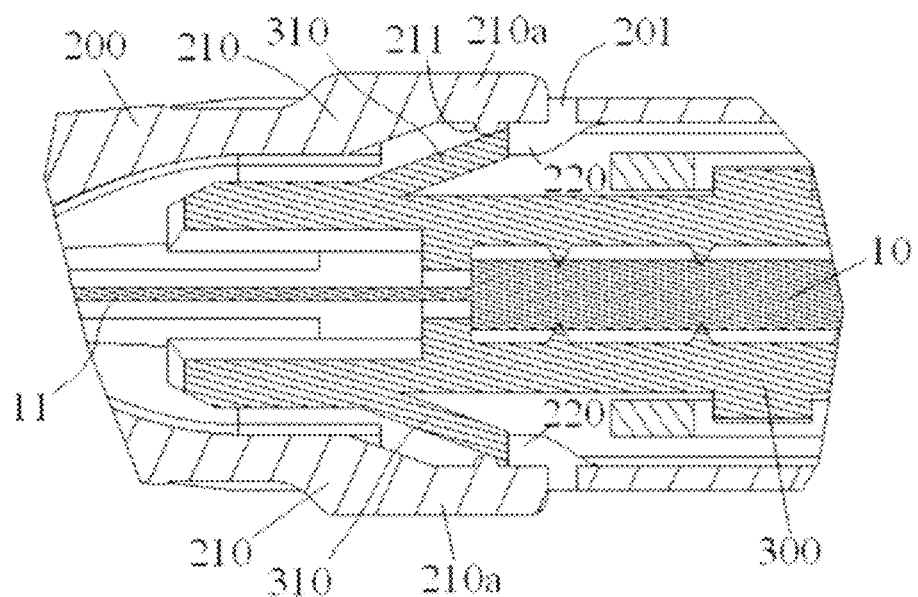
FIG. 6 is a magnified graphical representation of section A of the optical fibre connector shown in FIG. 4, wherein the curvature in the optical cable optical fibre 11 has been released, with it having straightened.

FIG. 6 is a magnified graphical representation of section A of the optical fibre connector shown in FIG. 4, wherein the curvature in the optical cable optical fibre 11 has been released and it has straightened again.

In an illustrative embodiment of the present invention, as is shown in FIG. 1 to FIG. 6, a pair of retaining protrusions 220 are also formed on the internal wall of said end sleeve 200, said pair of retaining protrusions 220 being positioned behind said paired positioning lugs 211. As shown in FIG. 5 and FIG. 6, when optical cable clamp 300 in the first position is subjected to a predetermined tension, the elastic reeds 310 on said optical cable clamp 300 slide past the positioning lugs 211, and connect with said retaining protrusions 220, as a result of which said optical cable clamp 300 is retained in said second position, thus preventing the optical cable clamp 300 from being pulled out of said end sleeve 200. When the optical cable clamp 300 is retained in the second position (the position shown in FIG. 6), the thrust of the optical cable clamp 300 on the optical fibre 11 of the optical cable 10 is released, and it straightens again.

In this manner, the interaction between the end sleeve 200 and the optical cable clamp 300 releases the slight curvature that occurs from butt-joining the optical cable optical fibres, thus improving the optical performance of the optical fibre connector.

In an illustrative embodiment of the present invention, as shown in FIG. 5 and FIG. 6, the positioning lugs 211 possess an arced external surface, as a result of which the paired elastic reeds 310 of the optical cable clamp 300 are able to slide past the positioning lugs 211 when subjected to a predetermined tension.

In an illustrative embodiment of the present invention, said positioning lugs 211 possess smooth semi-spherical external surfaces.

With reference to FIG. 1 to FIG. 6, in the embodiment shown, paired flexible arms 210 are formed on the lateral wall of the end sleeve 200. The paired flexible arms 210 being such that they may separately exert pressure on the paired elastic reeds 310 of the optical cable clamp 300, thus allowing the disconnection of the paired elastic reeds 310 from the retaining protrusions 220.

Continuing to refer to FIG. 5 and FIG. 6, in the embodiment shown in the drawings, the positioning lugs 211 are formed on the internal surfaces of the flexible arms 210, and when the flexible arms 210 exert pressure on the elastic reeds 310, the positioning lugs 211 exert pressure directly on the elastic reeds 310.

Figure 7:
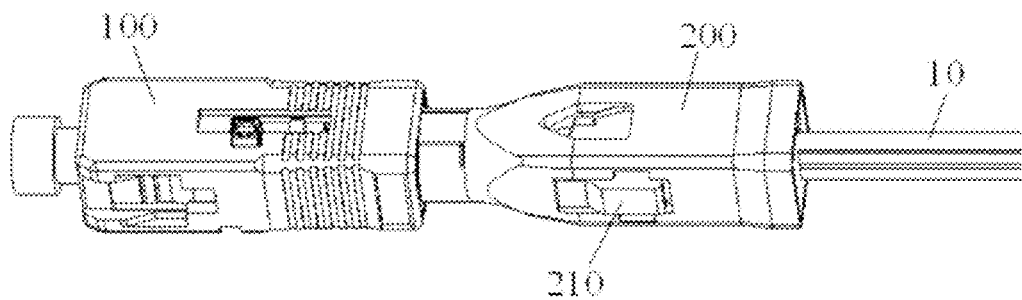
FIG. 7 is a three-dimensional graphical representation of an illustrative embodiment of an optical fibre connector that has already been attached.

FIG. 7 is a three-dimensional graphical representation of an illustrative embodiment of an optical fibre connector that has already been attached.

As shown in FIG. 5, FIG. 6 and FIG. 7, in one illustrative embodiment of the present invention, the flexible arms 210 possess raised sections 210a, the raised sections 210a protruding externally from the openings 201 formed in the lateral walls of the end sleeve 200. The result of this being that, it allows one to conveniently exert manual pressure on the paired flexible arms 210.

As shown in FIG. 4, in an illustrative embodiment of the present invention, the optical fibre connector also comprises a dust cap 101 in a sleeved arrangement on the front end of the ferrule 110.

As shown in FIG. 4, in one illustrative embodiment of the present invention, the optical fibre connector also comprises a V-shaped alignment slot 102 located within the housing 100, the optical fibre 11 within the optical cable 10 and the embedded optical fibre 111 within the ferrule 110 being butt-joined within the V-shaped alignment slot 102. As is shown in FIG. 4, the front-end section 11a of the optical fibre 11 of the optical cable 10 and the rear end section of the embedded optical fibre 111 are contained within the V-shaped alignment slot 102, being aligned with each other and coming into contact with each other, thus achieving the optical butt-joining of the optical cable optical fibre 11 and the embedded optical fibre 111.

As shown in FIG. 4, in one illustrative embodiment of the present invention, the optical fibre connector also comprises an optical fibre locking mechanism 103, the optical fibre locking mechanism 103 being such that it allows the optical cable optical fibre 11 and embedded optical fibre 111, that have already been butt-joined, to be locked in an appropriate position. Furthermore, the locking in of the optical fibres 11 and 111 that the optical fibre locking mechanism 103 causes can be released.

The following taken in conjunction with FIG. 1 to FIG. 7 provides a detailed description of the process for attaching the optical fibre connector of an embodiment of the present invention:

S110: as is shown in FIG. 2, the pre-prepared optical cable 10 is secured in an optical cable clamp 300; and S120: as shown in FIG. 3, FIG. 4 and FIG. 5, the optical cable clamp 300, within which the optical cable 10 is securely fastened, is fixed to a connector housing 100, the optical fibre 11 of the optical cable 10 then being inserted into the housing 100 of the connector, resulting in the optical cable optical fibre 11 being butt-joined with the embedded optical fibre 111 within the connector housing 100; and S130: the butt-joined optical cable optical fibre 11 and the embedded optical fibre 111 being locked in.

According to the above mentioned attachment method, the optical cable clamp 300 is installed by insertion within the end sleeve 200, the end sleeve 200 being connected to the rear end of the housing 100 of the connector, thus allowing the optical cable clamp 300 to be fixed to the housing 100 of the connector.

Within the aforementioned optical fibre connector attachment method, the optical fibre connector may be an optical fibre connector according to any of the aforementioned embodiments.

In the aforementioned attachment method, in step S120, the paired elastic reeds 310 of the optical cable clamp 300 separately rest on the paired positioning lugs 211 of the end sleeve 200, allowing for the retention of the optical cable clamp 300 in the first position (the position shown in FIG. 5). As is shown in FIG. 5, when the optical cable clamp 300 is retained in the first position, the optical fibre 11 of the optical cable 10 is subjected to thrust by the optical cable clamp 300, causing it to curve, which is convenient in terms of reliable butt-joining of the end surface of the optical cable 10 optical fibre 11 and the end surface of the embedded optical fibre 111 within the ferrule 110.

According to one illustrative embodiment of the present invention, the aforementioned attachment method also comprises the following steps:

S140: relying on the optical cable 10 to pull the optical cable clamp 300 outwards, causing the elastic reeds 310 of the optical cable clamp 300 to slide over the positioning lugs 211, connecting with the retaining protrusions 220 on the end sleeve 200.

As shown in FIG. 6, when the elastic reeds 310 on the optical cable clamp 300 connect with the retaining protrusions 220 on the end sleeve 200, the optical cable clamp 300 is retained within the end sleeve 200 in the second position. At this point, as shown in FIG. 6, the thrust of the optical cable clamp 300 on the optical fibre 11 of the optical cable 10 is released, and it straightens again, while the optical cable clamp 300 cannot be pulled out of the end sleeve 200.

Figure 8:
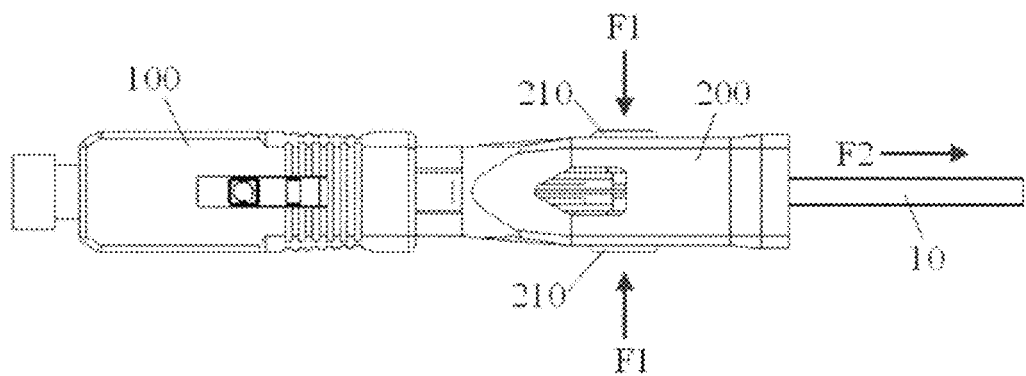
FIG. 8 is a disassembled graphical representation according to an illustrative embodiment of the optical fibre connector shown in FIG. 7.

FIG. 8 is a disassembled graphical representation according to an illustrative embodiment of the optical fibre connector shown in FIG. 7.

The following taken in conjunction with FIG. 1 to FIG. 8 provides a detailed description of the method for detaching an attached optical fibre connector according to an embodiment of the present invention:

S210: unlocking of said optical cable optical fibre 11 and the embedded optical fibre 111;

S220: the raised sections 210a of the paired flexible arms 210 in FIG. 8 are pressed inwards in the direction of the arrows F1, causing the paired flexible arms 210 to separately press on the paired elastic reeds 310 of the optical cable clamp 300, allowing the connection between the elastic reeds 310 and the retaining protrusions 220 to be released; and S230: pulling outward of the optical cable clamp 300 in the direction indicated by arrow F2 in FIG. 8, allowing for the removal of the optical cable clamp 300 from the end sleeve 200.

In this manner, the optical cable clamp 300 to which the optical cable 10 is secured may be pulled out of the end sleeve 200, thus achieving the rapid on-site detachment of the optical fibre connector.

As would be appreciated by a person skilled in the art, the embodiments mentioned above are provided merely for example, and a person skilled in the art would be able to carry out improvements to these embodiments, whereby as long as these do not conflict with the structures or principles described in these embodiments, they may be freely assembled.

Regardless of the fact that the present invention has been described in conjunction with the appended diagrams, the aim of the embodiments to which the appended diagrams relate is purely to provide illustrative descriptions of preferred implementations of the invention, and should not be understood as constituting any kind of restriction on the present invention.

Regardless of the fact certain embodiments which represent the overall concepts of the present invention have been displayed and described, an average technician in this field would be able to make various modifications to these embodiments which do not depart from the principles and spirit embodied by the concepts of this invention, the scope of this invention being defined by the claims and their equivalents.

It should be understood that, the wording "including" does not exclude other components or steps. Furthermore, the labelling of any component in the claims should not be understood as restricting the scope of the present invention in any way.

The invention claimed is:

1. An optical fiber connector, comprising:
    a housing having a first end and a second end;
    a ferrule positioned within said housing, said ferrule supporting an optical fiber stub having a rear end that extends rearwardly from said ferrule;
    an end sleeve mounted at said second end of said housing; and
    an optical cable clamp being pre-secured to an optical cable, the optical cable clamp being adapted to be inserted into said end sleeve;
    wherein an optical fiber of said optical cable extends into said housing and abuts said rear end of said optical fiber stub positioned within said ferrule.

2. The optical fiber connector according to claim 1, wherein
    said optical cable clamp is configured to be retained within said end sleeve in a separate first position and second position;
    when said optical cable clamp is retained in said first position, said optical fiber of said optical cable is subjected to thrust by said optical cable clamp, causing it to curve; and
    when said optical cable clamp is retained in said second position, said optical fiber of said optical cable is no longer subjected to thrust by said optical cable clamp, and straightens again.

3. The optical fiber connector according to claim 2, wherein a pair of elastic reeds is formed on an external wall of said optical cable clamp, and a pair of positioning lugs is formed on an internal wall of said end sleeve; and said pair of elastic reeds of said optical cable clamp are adapted to separately rest against said pair of positioning lugs of said end sleeve, allowing the retention of said optical cable clamp in said first position.

4. The optical fiber connector according to claim 3, wherein said pair of positioning lugs include an arced external surface such that said pair of elastic reeds of said optical cable clamp slide past said pair of positioning lugs when subjected to a predetermined tension, and wherein said pair of elastic reeds is disconnected from said pair of positioning lugs.

5. The optical fiber connector according to claim 4, wherein said pair of positioning lugs include smooth semi-spherical external surfaces.

6. The optical fiber connector according to claim 3, wherein a pair of retaining protrusions are provided on said internal wall of said end sleeve, said pair of retaining protrusions being positioned behind said pair of positioning lugs;
    when said optical cable clamp in said first position is subjected to a predetermined tension, said pair of elastic reeds on said optical cable clamp is adapted to slide past said pair of positioning lugs and engage said pair of retaining protrusions such that said optical cable clamp is retained in said second position, and wherein said optical cable clamp is prevented from being pulled out of said end sleeve.

7. The optical fiber connector according to claim 6, wherein a pair of flexible arms is formed on a lateral wall of said end sleeve, said pair of flexible arms being configured to separately exert pressure on said pair of elastic reeds of said optical cable clamp to allow disconnection of said pair of elastic reeds from said pair of retaining protrusions.

8. The optical fiber connector according to claim 7, wherein said pair of positioning lugs is formed on internal surfaces of said pair of flexible arms; additionally, when said pair of flexible arms exert pressure on said pair of elastic reeds, said pair of positioning lugs exert pressure directly on said pair of elastic reeds.

9. The optical fiber connector according to claim 8, wherein said pair of flexible arms include raised sections, said raised sections protruding externally from openings formed in the lateral walls of said end sleeve.

10. The optical fiber connector according to claim 1, wherein said optical fiber connector further comprises a dust cap in a sleeved arrangement on a front-end of said ferrule.

11. The optical fiber connector according to claim 1, wherein said optical fiber connector further comprises a V-shaped alignment slot located within said housing, said optical fiber of said optical cable being configured to abut with said embedded optical fiber of said ferrule within said V-shaped alignment slot.

12. The optical fiber connector according to claim 1, wherein said optical fiber connector further comprises an optical fiber locking mechanism installed within said housing, said optical fiber locking mechanism being configured to allow said optical fiber of said optical cable and said embedded optical to be locked in an appropriate position.

13. A method of attaching an optical fiber connector, comprising the following steps:
    pre-securing an optical cable clamp to an optical cable;
    fixing said optical cable clamp to a connector housing;
    inserting a ferrule into said connector housing, said ferrule supporting an optical fiber stub having a rear end that extends rearwardly from said ferrule;

inserting an optical fiber of said optical cable into said connector housing such that said optical fiber abuts with said rear end of said optical fiber stub positioned within said ferrule; and locking said optical fiber of said optical cable and said optical fiber stub in position.

14. The method according to claim 13, wherein the step of fixing said optical cable clamp to said connector housing comprises: inserting said optical cable clamp within an end sleeve, said end sleeve being connected to a rear end of said connector housing to secure said optical cable clamp to said connector housing.

15. The method according to claim 14, wherein said end sleeve and said optical cable clamp are configured to allow said optical cable clamp to be retained within said end sleeve in a separate first position and second position;

when said optical cable clamp is retained in said first position, said optical fiber of said optical cable is subjected to thrust by said optical cable clamp, causing it to curve; and when said optical cable clamp is retained in said second position, said optical fiber of said optical cable is no longer subjected to thrust by said optical cable clamp, and straightens again.

16. The method according to claim 15, wherein a pair of elastic reeds of said optical cable clamp is configured to separately rest against a pair of positioning lugs of said end sleeve to allow retention of said optical cable clamp in said first position.

17. The method according to claim 16, further including a step of: pulling said optical cable clamp outwards such that said pair of elastic reeds of said optical cable clamp slide over said pair of positioning lugs and connect with a pair of retaining protrusions on said end sleeve thereby causing said optical cable clamp to remain in said second position.

18. An optical fiber connector detachment method including an optical fiber connector defined by claim 9, and said detachment method comprising the following steps:

unlocking said optical fiber of said optical cable and said embedded optical fiber;

exerting pressure inwards on said raised sections of said pair of flexible arms such that said pair of flexible arms exert pressure separately on said pair of elastic reeds of said optical cable clamp to release the connection between said pair of elastic reeds and said pair of retaining protrusions; and pulling said optical cable clamp outward to allow for the removal of said optical cable clamp from said end sleeve.

19. An optical fiber connector, comprising:

a main connector body having a front end and a rear end, the rear end of the main connector body having an anchoring interface;

a ferrule that mounts at the front end of the main connector body, the ferrule supporting an optical fiber stub, the optical fiber stub including a first portion secured within the ferrule and a second portion that extends rearwardly from the ferrule;

an optical fiber alignment device positioned within the optical fiber connector, the optical fiber alignment device being adapted to support the second portion of the optical fiber stub; and a cable anchoring unit being pre-secured to an optical cable;

wherein the anchoring interface of the main connector body is adapted to connect the cable anchoring unit to the rear end of the main connector body;

when the cable anchoring unit is connected to the main connector body, an optical fiber of the optical cable extends into the optical fiber connector and abuts the second portion of the optical fiber stub positioned within the optical fiber alignment device such that a predetermined amount of buckling is achieved.

* * * * *